(12) United States Patent
Cook et al.

(10) Patent No.: US 7,003,295 B1
(45) Date of Patent: Feb. 21, 2006

(54) SHORT-RANGE WIRELESS TRANSMITTER REGISTRATION FOR A MOBILE USER OF A COMMUNICATIONS SYSTEM

(75) Inventors: Fred S. Cook, Olathe, KS (US); Jim F. Pearce, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 522 days.

(21) Appl. No.: 10/223,135

(22) Filed: Aug. 19, 2002

(51) Int. Cl.
*H04Q 7/20* (2006.01)
(52) U.S. Cl. ............... 455/435.1; 455/41.2; 455/432.1
(58) Field of Classification Search ............... 455/41.2, 455/41.3, 432.1, 435.1, 436, 411, 67.11, 458
See application file for complete search history.

(56) References Cited

U.S. PATENT DOCUMENTS 5,995,842 A * 11/1999 Jonsson ...................... 455/462
6,285,882 B1 * 9/2001 Cornillat et al. .......... 455/435.1
6,857,021 B1 * 2/2005 Schuster et al. ............ 709/227
2004/0203768 A1 * 10/2004 Ylitalo et al. ............. 455/435.1
2005/0159173 A1 * 7/2005 Dowling ................... 455/456.3

* cited by examiner

*Primary Examiner*—Temica Beamer

(57) ABSTRACT

A communication system comprises a transmitter, receiver, communication device, and control system. The transmitter transmits a wireless registration signal within a maximum range. The receiver receives the wireless registration signal from the transmitter when in range of the transmitter. The receiver transfers registration information based on the wireless registration signal to a control system. The control system receives and processes the registration information from the receiver to identify the user. In response to identifying the user, the control system directs communications for the user to the communication device. The communication device is located near the receiver—less than the maximum range. The maximum range could be less than one-hundred feet or less than fifty feet.

8 Claims, 5 Drawing Sheets

SHORT-RANGE WIRELESS TRANSMITTER REGISTRATION FOR A MOBILE USER OF A COMMUNICATIONS SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a communication system that uses a short-range wireless transmitter to automatically register a mobile user to use communication devices in the communication system.

2. Description of the Prior Art

A wireless communication system provides communications to a user despite the movement of the user within the system. In a wireless communication system, a mobile telephone exchanges wireless registration signals with a base station. The base station sends a registration message to a registration database. The wireless communication system then uses the registration database to forward calls to the base station that currently registers the mobile telephone. Unfortunately, this wireless communication system is complex and expensive.

The industry is developing a specification, referred to as Bluetooth, that specifies a wireless transceiver microchip that allows devices in a room or home to discover one another and communicate over a wireless link. The microchip can be integrated into phones, computers, or similar devices. Unfortunately, communication systems utilizing Bluetooth devices have not been fully designed or implemented.

Call-forwarding systems allow some user mobility without a complex wireless communication system. In a call-forwarding system, the user has calls that were placed to a first telephone number forwarded to a second telephone number. For example, the user may have calls that are placed to their office telephone number forwarded to their mobile telephone number. In another example, the user may have a personal telephone number that must be translated into a second telephone number for routing. The first number stays the same, but the user may change the second telephone number. To invoke call-forwarding, the user calls the call-forwarding system to identify themselves and provide the second telephone number. Unfortunately, the call-forwarding system forces the user to continually call in and manually register as they move about.

SUMMARY OF THE INVENTION

The invention solves the above problems with a communication system that allows a mobile user to automatically receive communications despite moving around within the system. The communication system uses a short-range wireless transmitter to automatically register the user with the system, so the user may use proximately located communication devices. The communication system is less complex and expensive than wireless communication systems. The communication system does not require the user to continually call in and manually register.

The communication system comprises a transmitter, receiver, communication device, and control system. The transmitter transmits a wireless registration signal within a maximum range. The receiver receives the wireless registration signal when in range of the transmitter. The receiver transfers registration information based on the wireless registration signal to a control system. The control system receives and processes the registration information from the receiver to identify the user. In response to identifying the user, the control system directs communications for the user to the communication device. The communication device is located near the receiver—less than the maximum range. The maximum range could be less than one-hundred feet or less than fifty feet.

BRIEF DESCRIPTION OF THE DRAWINGS

The same reference number represents the same element on all drawings.

DETAILED DESCRIPTION OF THE PREFERRED EMBODIMENT

Figure 1:
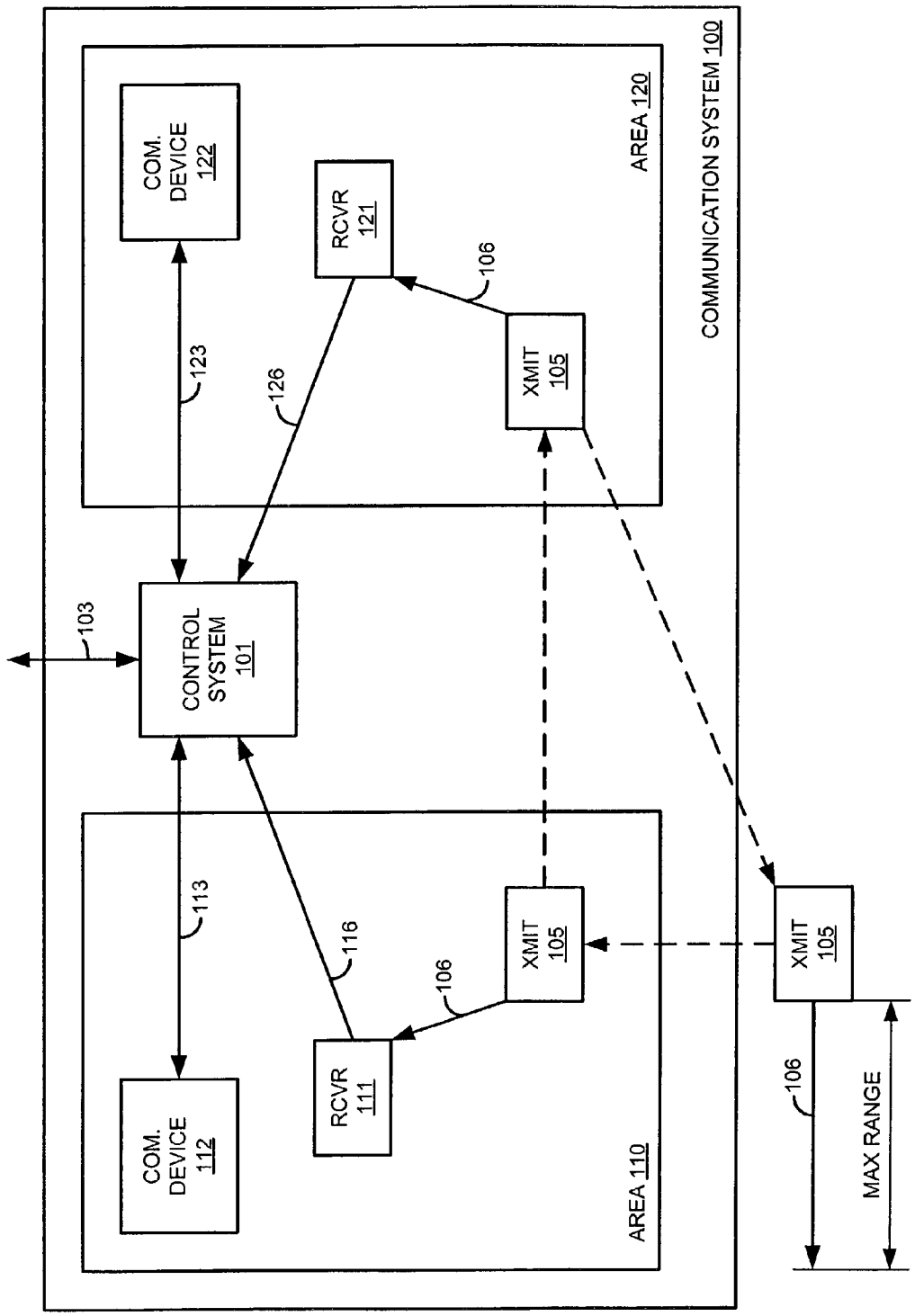
FIG. 1 is a block diagram of a communication system configuration in an example of the invention.
Figure 2:
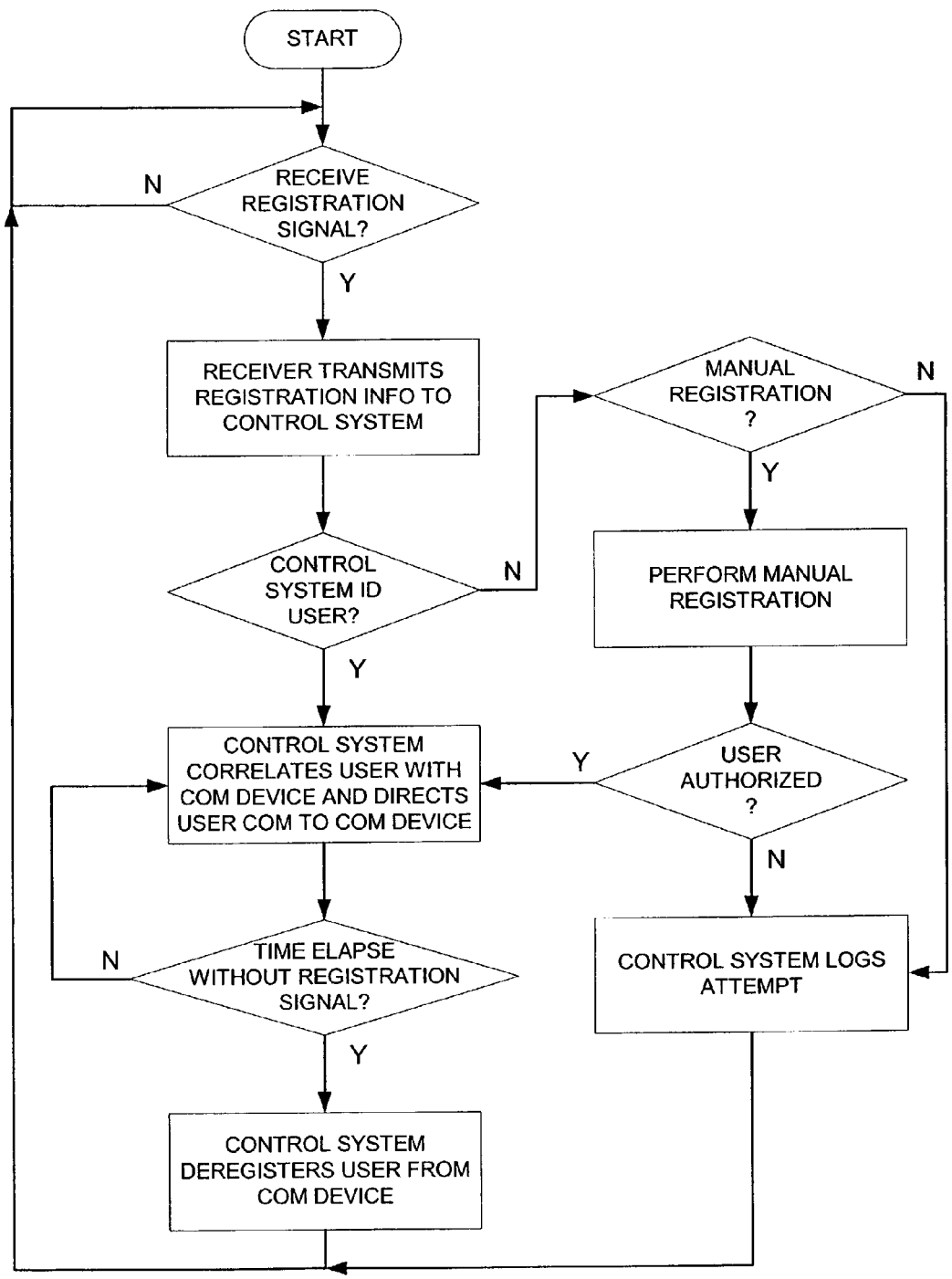
FIG. 2 is a flow diagram of communication system operation in an example of the invention.

Communication System—FIGS. 1–2

FIGS. 1–2 depict a specific example of a communication system in accord with the present invention. Those skilled in the art will appreciate numerous variations from this example that do not depart from the scope of the invention. Those skilled in the art will also appreciate that various features described below could be combined to form multiple variations of the invention. Those skilled in the art will appreciate that some conventional aspects of FIGS. 1–2 have been simplified or omitted for clarity.

FIG. 1 is a block diagram of communication system 100 in an example of the invention. Communication system 100 comprises control system 101, transmitter 105, area 110, and area 120. Area 110 contains receiver 111 and communication device 112. Area 120 contains receiver 121 and communication device 122.

Transmitter 105 is typically a very small, low-power device that is convenient for the user to carry around and operate. Transmitter 105 is a short-range transmitter that could be an RF transmitter like that used in a wireless computer mouse or some other type of short-range transmitter. Transmitter 105 could be a Bluetooth device. Transmitter 105 may be integrated within another device, such as a personal digital assistant. Transmitter 105 generates and transmits wireless registration signal 106.

Wireless registration signal 106 includes unique information that can be processed to identify the user. The term "user" may indicate an individual or a group who share a user account. The term "user" may also indicate a role for an area, such as the doctor who is currently on-call within area 110. Wireless registration signal 106 has a maximum range somewhere between 0–200 feet. The maximum range may be limited by attenuation over the air interface or by obstacles such as walls. In various examples of the invention, the maximum range is less than 100 feet, less than 50 feet, or less than 30 feet.

Receiver 111 is a short-range receiver. Receiver 111 could be an RF receiver like that used for a wireless computer mouse or some other type of short-range receiver. Receiver 111 could be a Bluetooth device. When in range, receiver 111 receives wireless registration signal 106 from transmitter 105. The term "in-range" means that wireless registration signal 106 is at or above a specified signal level when received by receiver 111. Transmitter 105 may continually transmit wireless registration signal 106 or transmit it as directed by the user. Alternatively, receiver 111 may broadcast a pilot signal, and transmitter 105 would transmit wireless registration signal 106 in response to initially receiving the pilot signal.

Receiver 111 generates registration information 116 based on wireless registration signal 106 and transfers registration information 116 to control system 101. Registration information 116 allows control system 101 to identify the user and to correlate the user with communication device 112. Note that receiver 111 is shown as a single unit on FIG. 1, but that it may be comprised of multiple inter-operating receivers that act together in a single coverage area as described for receiver 111.

Receiver 121 is similar to receiver 111. When in range, receiver 121 receives wireless registration signal 106 from transmitter 105. Receiver 111 generates registration information 126 based on wireless registration signal 106 and transfers registration information 126 to control system 101. Registration information 126 allows control system 101 to identify the user and to correlate the user with communication device 122.

Communication devices 112 and 122 could be telephones, fax machines, computers, video equipment, printers, or other similar devices. Communication devices 112 and 122 are respectively located within the maximum range of receivers 111 and 112. For example, communication device 112 could be in the same room as receiver 111. Receivers 111 and 112 may even be respectively located within communication devices 112 and 122.

Note that although the singular term "communication device 112" is used for simplicity, area 110 could include multiple communication devices that are handled like communication device 112, and thus, a user could have multiple communications directed to multiple communication devices within area 110. Likewise, area 120 could include multiple communication devices that are handled like communication device 122, and thus, a user could have multiple communications directed to multiple communication devices within area 120.

Communication system 100 could be installed within a campus or a building. Areas 110 and 120 are separate physical spaces within communication system 100. Areas 110 and 120 could be rooms, halls, buildings, entry ways, stores, yards, or some other type of physical space. Control system 101 could be inside or outside of the areas 110 and 120. Control system 101 could be a PBX or some other communications platform configured to operate as described below.

Because of the maximum range of transmitter 105, receivers 111 and 121 cannot receive registration signal 106 at the same time. In contrast, the typical wireless telephone has a much larger range than transmitter 105, and thus, wireless communication systems require complex procedures to handle situations where the wireless telephone is in range of multiple base stations. In communication system 100, the user is only registered in one area at a time because of the short-range registration signal. When the user leaves an area and enters a new area, any old registration is superceded by the new registration.

FIG. 2 is a flow diagram of communication system 100 operation in an example of the invention. The operation is described below with respect to the user moving transmitter 105 into communication system 100 and area 110, then to area 120, and then out of communication system 100. The movement of the user and transmitter 105 is indicated on FIG. 1 by dashed lines. The operation for additional users is similar.

When transmitter 105 is outside of communication system 100, receivers 111 and 121 are out of range and do not receive wireless registration signal 106. When transmitter 105 is moved into area 110 of communication system 100, receiver 111 is now in range and receives wireless registration signal 106, but receiver 121 is still out of range and does not receive wireless registration signal 106. In response to receiving wireless registration signal 106, receiver 111 generates and transmits registration information 116 to control system 101.

Control system 101 receives and processes registration information 116 from receiver 111 to identify the user and correlate the user with communication device 112. User identification might include a user's identification number, account number, telephone number, network address, or other similar information. In response to successfully processing registration information 116 to identify the user, communication system 101 receives communications 103 for the user and directs corresponding communications 113 to communication device 112. The user may then use communication device 112 to receive voice calls, data, video, faxes, or other information.

Manual registration is used in some examples of the invention as follows. If control system 101 cannot successfully process registration information 116 to identify the user, then communication system 101 generates and transmits a request for manual registration to a manual registration device in area 110 if manual registration is available for area 110. The manual registration device could be receiver 111, communication device 112, or some other device. The manual registration device transmits a request signal to transmitter 105. Transmitter 105 receives the request signal and indicates to the user, such as through a tone, light, or display, that manual registration is requested. The user then uses communication device 112 to manually register by providing a user identification number, account number, telephone number, network address, or other similar information. For example, the user may use a telephone to access a voice response unit and enter registration information through the telephone. If the user is authorized through the manual registration, then control system 101 correlates the user with user registration signal 106 for future automatic registration by transmitter 105. Control system 101 also correlates the user with communication device 112.

When transmitter 105 is moved from area 110 to area 120, receiver 121 is now in range and receives wireless registration signal 106, but receiver 111 is now out of range and does not receive wireless registration signal 106. This movement will cause control system 101 to de-register the user in area 110. In response to receiving wireless registration signal 106, receiver 121 generates and transmits registration information 126 to control system 101. Control system 101 receives and processes registration information 126 from receiver 121 to identify the user and correlate the user with communication device 122. This new registration for area 120 supercedes the previous registration for area 110—if it still exists. In response to successfully processing registration information 126 from receiver 121, communication system 101 receives communications 103 for the user and directs corresponding communications 123 to communication device 122. The user may then use communication device 122 to receive voice calls, data, video, faxes, or other information.

When transmitter 105 is moved outside of area 120, receiver 121 is now out of range and does not receive wireless registration signal 106. After a time period elapses without receiving registration signal 106 in area 120, control system 101 de-registers the user in area 120 and no longer directs communications for the user to communication device 122. This same de-registration process occurs for area 110.

Figure 3:
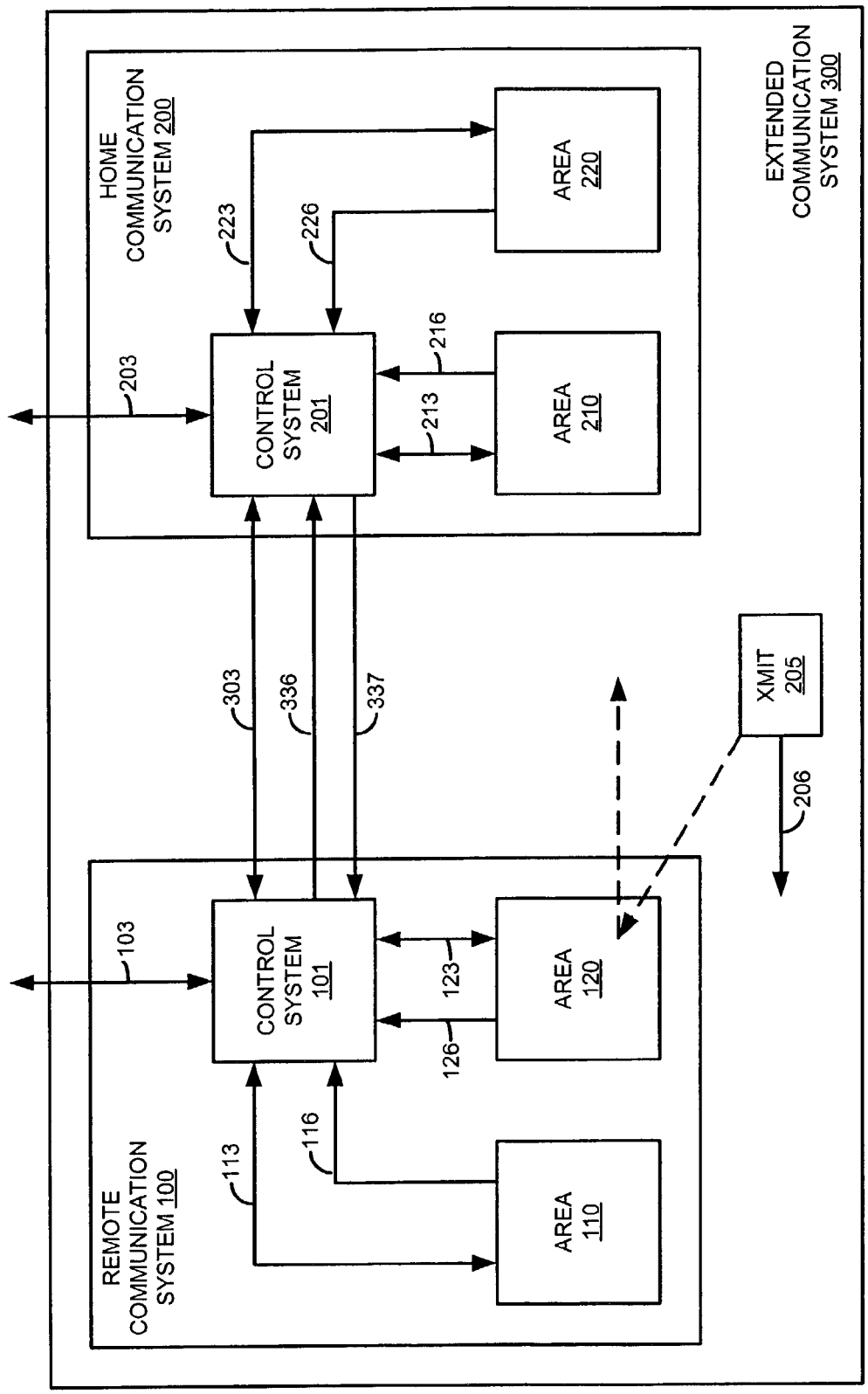
FIG. 3 is a block diagram of an extended communication system configuration in an example of the invention.
Figure 4:
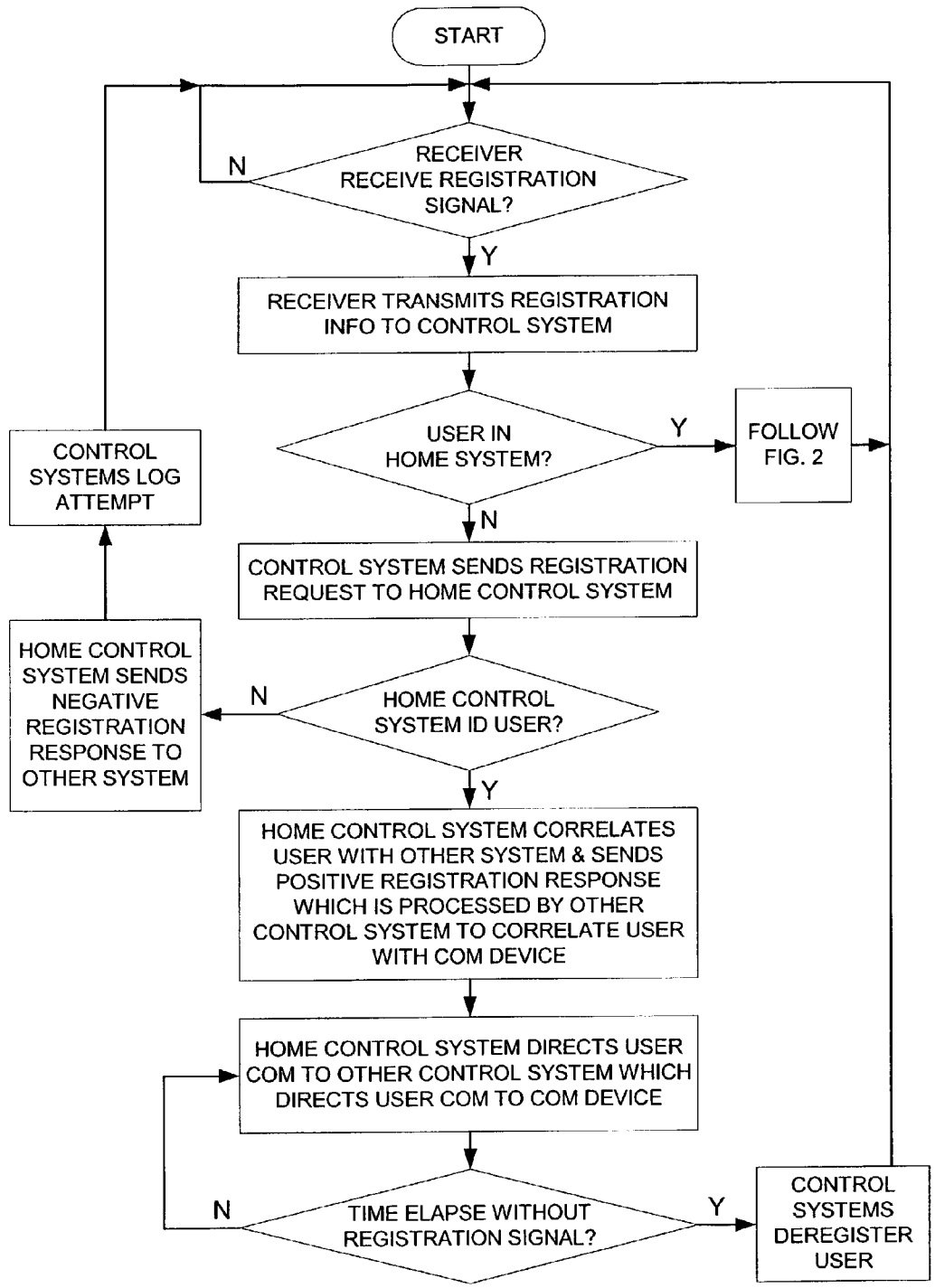
FIG. 4 is a flow diagram of extended communication system operation in an example of the invention.
Figure 5:
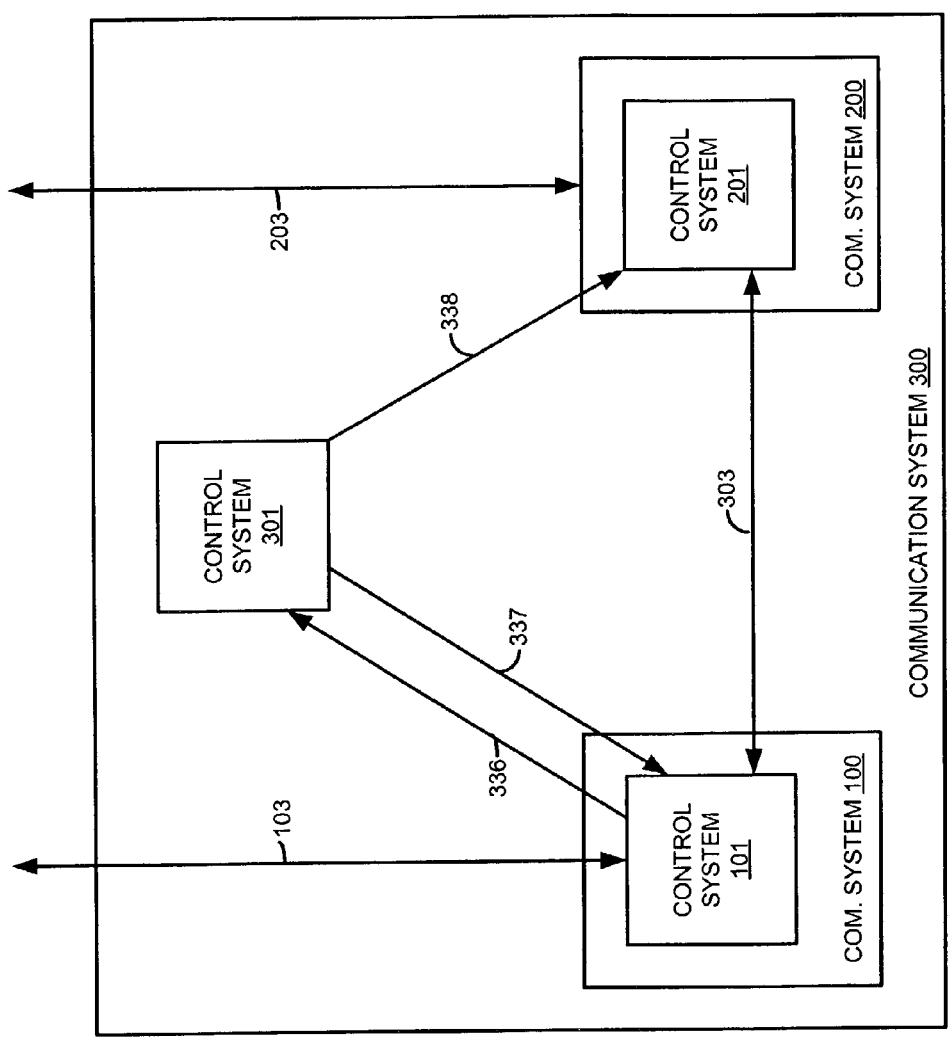
FIG. 5 is a block diagram of a variation in the extended communication system in an example of the invention.

Extended Communication System—FIGS. 3–5

FIGS. 3–5 depict a specific example of a communication system in accord with the present invention. Those skilled in the art will appreciate numerous variations from this example that do not depart from the scope of the invention. Those skilled in the art will also appreciate that various features described below could be combined to form multiple variations of the invention. Those skilled in the art will appreciate that some conventional aspects of FIGS. 3–5 have been simplified or omitted for clarity.

FIG. 3 is a block diagram of extended communication system 300 in an example of the invention. Extended communication system 300 comprises remote communication system 100 and home communication system 200. Remote communication system 100 is the same as communication system 100 described above, but is further modified as described below. Home communication system 200 is similar to the modified communication system 100. Home communication system 200 is the home system for the user of transmitter 205. The user's home communication system 200 is where communications for the user are typically directed. For example, the user's office telephone and computer could be in home communication system 200. Transmitter 205 generates and transmits wireless registration signal 206 to include unique information that can be processed to identify the user and the user's home communication system 200.

FIG. 4 is a flow diagram of extended communication system 300 operation in an example of the invention. The operation is described below with respect to the user moving transmitter 205 in and out of area 120 in remote communication system 100. The movement of the user and transmitter 205 is indicated on FIG. 3 by dashed lines. The operation for additional users is similar.

When transmitter 205 is moved into area 120 of communication system 100, receiver 121 is now in range and receives wireless registration signal 206. As mentioned above, transmitter may be responding to a pilot signal from receiver 121. Based on wireless registration signal 206, receiver 121 generates and transmits registration information 126 to control system 101 that allows control system 101 to identify the user's home communication system 200.

Control system 101 receives and processes registration information 126 from receiver 121 to determine the user's home communication system. If the user is homed to communication system 100, then the process described above for FIG. 2 is followed. If the user is homed to communication system 200, then control system 101 transmits registration request 336 to control system 201. Registration request 336 may include routing information for transfer over a network to control system 201.

Control system 201 processes registration request 336 to identify the user. If control system 201 cannot identify the user, then control system 201 transfers registration response 337 to control system 101 to deny registration or request manual registration as described above. If control system 201 can identify the user, then control system 201 correlates the user with communication system 100 and transfers registration response 337 to control system 101 to accept the registration.

Control system 101 processes the registration response from control system 201 to correlate the user with communication device 122. In response to successful registration, control system 201 receives communications 203 for the user and directs corresponding communications 303 to communication system 100, and control system 101 receives communications 303 for the user and directs corresponding communications 126 to communication device 122. The user may then use communication device 122 to receive voice calls, data, video, faxes, or other information. If the user were to move to area 110 within communication system 100, the process of FIG. 2 would be followed to re-direct communications for the user to communication device 112 in area 110.

When transmitter 205 is moved outside of communications system 100, receiver 121 is now out of range and does not receive wireless registration signal 206. After a time period elapses without receiving registration signal 206 in communication system 100, control system 101 de-registers the user and informs control system 201 of the de-registration. In response to de-registration, control systems 210 and 101 no longer direct communications for the user to communication device 122.

FIG. 5 is block diagram that depicts a variation in communications system 300. Control system 301 adds centralized processing when the user registers outside of their home system. Control system 300 maintains correlations between users and their home systems and can register users and provide appropriate instructions to the relevant communication systems.

If the user enters remote communication system 100 with their transmitter, then control system 101 receives and processes registration information to determine if the user is homed to communication system 100, and if so, the process described above for FIG. 2 is followed. If the user is not homed to communication system 100, then control system 101 transfers registration request 336 to control system 301.

Control system 301 processes registration request 336 to identify the user. If control system 301 cannot identify the user, then control system 301 transfers registration response 337 to control system 101 to deny registration or request manual registration. If control system 301 can identify the user, then control system 301 correlates the user with communication system 100 and transfers registration response 337 to control system 101 to accept the registration. Control system 301 also sends registration instruction 338 to home communication system 200. Communication system 200 processes registration instruction 338 to correlate the user with communication system 100. Control system 101 processes registration response 337 to correlate the user with the appropriate communication device. In response to successful registration, control system 201 receives communications 203 for the user and directs corresponding communications 303 to communication system 100, and control system 101 receives communications 303 for the user and directs corresponding communications to the appropriate communication device.

When the user leaves communication system 100, control system 101 de-registers the user, and if the user has not registered elsewhere in communications system 100, then control system 101 informs control system 301 of the de-registration. Control system 301 informs control system 201 of the de-registration.

Those skilled in the art will appreciate that the control systems can be distributed or combined in various ways without departing from the scope of the invention. The control systems include instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of operating a communication system, wherein a user has a home system that receives communications directed to the user and wherein the user carries a short-range wireless transmitter having a maximum range of less than one-hundred feet, the method comprising:
   in a remote system, receiving a wireless registration signal from the short-range wireless transmitter, wherein the wireless registration signal identifies the user and the user's home system;
   in the remote system, identifying the user's home system and transferring a registration message identifying the user to the user's home system in response to receiving the wireless registration signal;
   in the home system, receiving the registration message and registering the user with the remote system in response to receiving the registration message;
   in the home system, receiving a communication directed to the user and transferring the communication to the remote system in response to the user registration;
   in the remote system, receiving the communication from the user's home system and transferring the communication to a communication device proximate to the user;
   in the remote system, detecting that a time period has elapsed without receiving the wireless registration signal;
   in the remote system, transferring a de-registration message identifying the user to the user's home system in response to the detected time period;
   in the home system, receiving the de-registration message and de-registering the user from the remote system in response to receiving the de-registration message; and
   in the home system, receiving another communication directed to the user and transferring the other communication to a communication device in the home system in response to the user de-registration.

2. The method of claim 1 further comprising transferring a pilot signal in the remote system wherein the short-range wireless transmitter transfers the wireless registration signal in response to receiving the pilot signal.

3. The method of claim 1 wherein the short-range wireless transmitter periodically transfers the wireless registration signal.

4. The method of claim 1 wherein the wireless registration signal comprises a Bluetooth signal.

5. A communication system wherein a user carries a short-range wireless transmitter having a maximum range of less than one-hundred feet, the communication system comprising:
   a remote system configured to receive a wireless registration signal from the short-range wireless transmitter, wherein the wireless registration signal identifies the user and the user's home system, and wherein the user's home system receives communications directed to the user;
   the remote system is further configured to identify the user's home system and transfer a registration message identifying the user to the user's home system in response to receiving the wireless registration signal;
   the home system is configured to receive the registration message and register the user with the remote system in response to receiving the registration message, and to receive a communication directed to the user and transfer the communication to the remote system in response to the user registration;
   the remote system is further configured to receive the communication from the user's home system and transfer the communication to a communication device proximate to the user;
   the remote system is further configured to detect that a time period has elapsed without receiving the wireless registration signal and transfer a de-registration message identifying the user to the user's home system in response to the detected time period;
   the home system is further configured to receive the de-registration message and de-register the user from the remote system in response to receiving the de-registration message; and
   the home system is further configured to receive another communication directed to the user and transfer the other communication to a communication device in the home system in response to the user de-registration.

6. The communication system of claim 5 wherein the remote system is further configured to transfer a pilot signal wherein the short-range wireless transmitter transfers the wireless registration signal in response to receiving the pilot signal.

7. The communication system of claim 5 wherein the short-range wireless transmitter periodically transfers the wireless registration signal.

8. The communication system of claim 5 wherein the wireless registration signal comprises a Bluetooth signal.

* * * * *